US009325646B2

(12) United States Patent
Kannan et al.

(10) Patent No.: US 9,325,646 B2
(45) Date of Patent: Apr. 26, 2016

(54) PROVIDING CONTEXTUAL MESSAGES RELATING TO CURRENTLY ACCESSED CONTENT

(71) Applicant: Verizon Patent and Licensing Inc., Basking Ridge, NJ (US)

(72) Inventors: Shrividhyaa N. Kannan, Tamil Nadu (IN); Syed Mohasin Zaki, Tamil Nadu (IN); Raju T. Ramakrishnan, Karnataka (IN); Karthic Chinnadurai, Tamil Nadu (IN)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 183 days.

(21) Appl. No.: 14/064,669

(22) Filed: Oct. 28, 2013

(65) Prior Publication Data

US 2015/0120839 A1 Apr. 30, 2015

(51) Int. Cl.
| | |
|---|---|
| *H04L 12/58* | (2006.01) |
| *H04L 29/08* | (2006.01) |
| *H04N 21/23* | (2011.01) |
| *H04N 21/234* | (2011.01) |
| *H04N 21/41* | (2011.01) |
| *H04N 21/472* | (2011.01) |
| *H04N 21/4722* | (2011.01) |
| *H04N 21/658* | (2011.01) |
| *H04N 21/81* | (2011.01) |

(52) U.S. Cl.
CPC .............. *H04L 51/046* (2013.01); *H04L 51/20* (2013.01); *H04L 67/18* (2013.01); *H04N 21/23* (2013.01); *H04N 21/23418* (2013.01); *H04N 21/23424* (2013.01); *H04N 21/4104* (2013.01); *H04N 21/4126* (2013.01); *H04N 21/472* (2013.01); *H04N 21/4722* (2013.01); *H04N 21/6581* (2013.01); *H04N 21/812* (2013.01)

(58) Field of Classification Search
CPC ....... H04L 51/046; H04L 51/20; H04L 67/18; H04N 21/23418; H04N 21/23424; H04N 21/23; H04N 21/4104; H04N 21/4126; H04N 21/472; H04N 21/4722; H04N 21/6581; H04N 21/812

See application file for complete search history.

(56) References Cited

U.S. PATENT DOCUMENTS

| | | | |
|---|---|---|---|
| 7,013,301 B2 | 3/2006 | Holm et al. | |
| 8,635,302 B2 * | 1/2014 | Christensen | G06Q 30/02 370/301 |
| 8,887,223 B2 * | 11/2014 | Kim | H04L 65/4076 709/204 |
| 8,997,164 B2 * | 3/2015 | Gordon et al. | 725/105 |
| 9,110,929 B2 * | 8/2015 | Garcia | H04L 65/4084 |
| 9,117,227 B1 * | 8/2015 | Agrawal | G06Q 30/0242 |
| 9,226,012 B2 * | 12/2015 | McKissick | H04N 21/2543 |
| 2002/0184626 A1 * | 12/2002 | Darbee et al. | 725/39 |
| 2007/0011704 A1 * | 1/2007 | Anglin | 725/46 |
| 2009/0288126 A1 * | 11/2009 | Candelore et al. | 725/110 |
| 2010/0095326 A1 * | 4/2010 | Robertson, III | 725/40 |
| 2011/0083157 A1 * | 4/2011 | Addair | 725/120 |
| 2011/0154224 A1 * | 6/2011 | Bates | G06Q 10/10 715/758 |
| 2012/0144416 A1 * | 6/2012 | Wetzer et al. | 725/14 |
| 2013/0073387 A1 * | 3/2013 | Heath | G06Q 50/01 705/14.53 |
| 2014/0075469 A1 * | 3/2014 | Zhao | H04N 21/4784 725/32 |
| 2014/0129322 A1 * | 5/2014 | George | G06Q 30/02 705/14.45 |
| 2014/0157295 A1 * | 6/2014 | Jagtiani et al. | 725/13 |
| 2014/0373048 A1 * | 12/2014 | Mo | G06Q 30/02 725/34 |

* cited by examiner

*Primary Examiner* — Patrice Winder
*Assistant Examiner* — Angela Widhalm De Rodrig (57) ABSTRACT

One or more first devices may receive, from a second device, program information as part of a request to provide a contextual message, associated with particular content corresponding to the program information, to a third device. The program information may identify a time, a geographic location, and a television channel identifier associated with the particular content. The one or more devices may cause the particular content to be identified based on a fingerprint of the particular content; receive the contextual message that was identified based on the fingerprint; provide the contextual message to the third device; and provide, for storage in a content schedule, information identifying the particular content, a time period during which the particular content is broadcasted, the geographic location, and the television channel identifier. The content schedule may be used to identify the particular content after the particular content has been initially identified based on the fingerprint.

20 Claims, 9 Drawing Sheets

| Contextual Message Data | | | |
|---|---|---|---|
| Content 510 | Content Owner 520 | Audio/Image Fingerprint Data 530 | Contextual Message 540 |
| Advertisement 1 | Owner 1 | Data 1 | Message 1 |
| Advertisement 2 | Owner 2 | Data 2 | Message 2 |
| Advertisement 3 | Owner 3 | Data 3 | Message 3 |
| Default | N/A | N/A | Default Message |

| Content Schedule |||
| :---: | :---: |
| Channel: 123 Location/Market: Market ABC |||
| Time Index | Content |
| 12:00:00-12:10:00 | TV Program XYZ |
| 12:10:01-12:10:31 | Advertisement 1 |
| 12:10:31-12:11:01 | Advertisement 2 |
| 12:11:01-12:12:01 | Advertisement 3 |

PROVIDING CONTEXTUAL MESSAGES RELATING TO CURRENTLY ACCESSED CONTENT

BACKGROUND

Users sometimes interact with user devices (e.g., smart phones, tablets, laptop computers, desktop computers, etc.) while viewing broadcasted content, received by a content receiving device (e.g., a set-top box, or the like), on a display connected to the content receiving device.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may identify particular content currently being broadcasted (e.g., by a content broadcaster) and received by a content receiving device (e.g., a set-top box, a digital television tuner, or the like). In some implementations, the systems and/or methods may provide a user device, connected to a common network as the content receiving device, with a contextual message corresponding to broadcasted content currently being received by the content receiving device. In some implementations, the contextual message may include a uniform resource locator (URL) link to a web page that includes content associated with the broadcasted content (e.g., offers to purchase items relating to the broadcasted content, credits to a rewards account, or the like), an instruction to cause the user device to open an application, and/or an instruction to cause the user device to perform some other task.

In some implementations, the particular content may correspond to a television program, an advertisement that is being broadcasted during a break in the television program, and/or some other type content. In some implementations, the systems and/or methods may identify the content that is being broadcasted at a particular moment (e.g., an advertisement or a television program) without relying on a broadcast schedule that may not be accurate (e.g., since the broadcast schedule may change due to marketing decisions, or may vary for broadcasts of live events with dynamic advertisement breaks).

Figure 1:
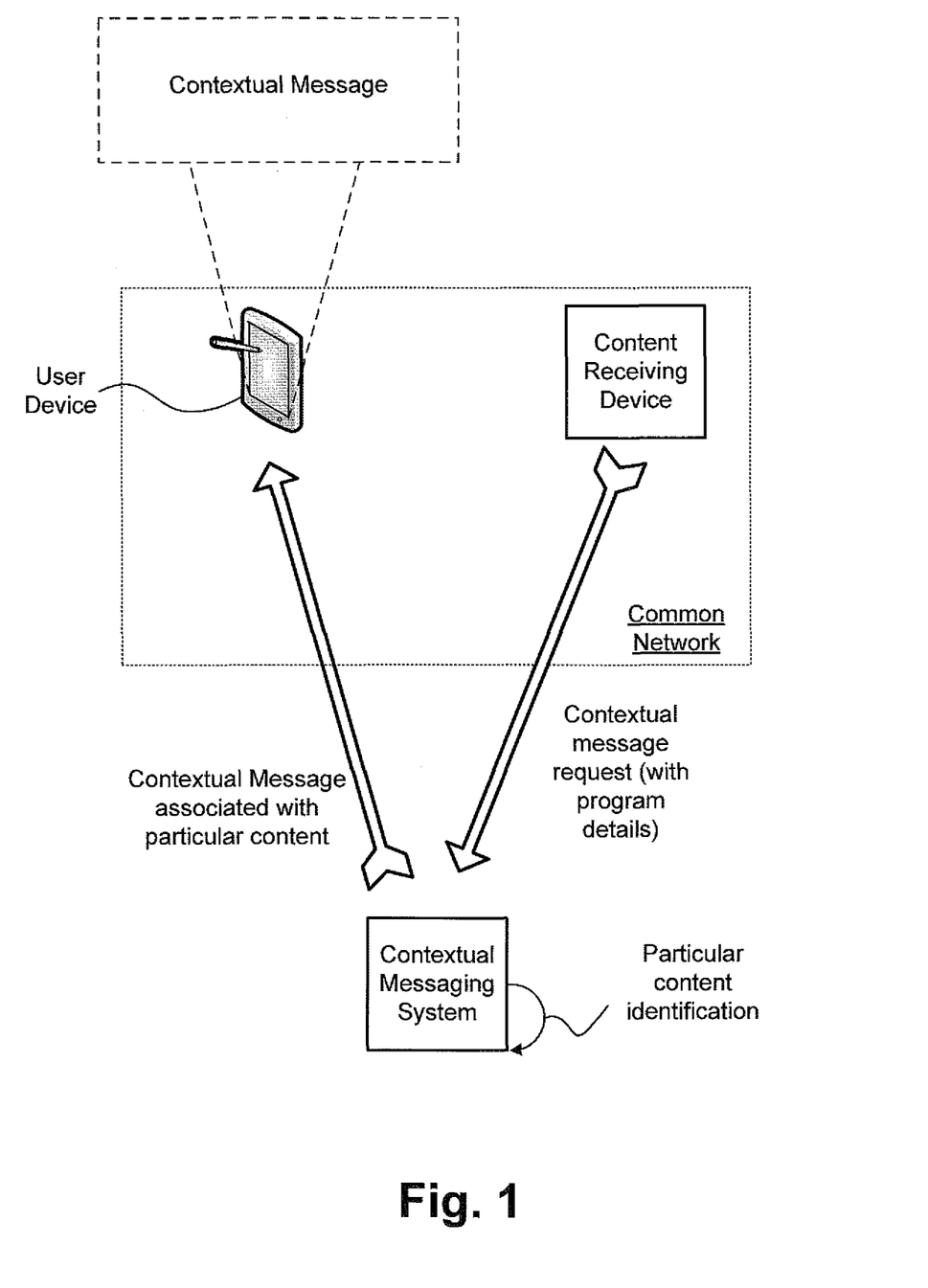
FIG. 1 illustrates an example overview of an implementation described herein.

FIG. 1 illustrates an example overview of an implementation described herein. As shown in FIG. 1, a content receiving device and a user device may connect via a common network, such as local area network (LAN) associated with a home, an office, or some other type of facility. In some implementations, the content receiving device may request a contextual message from a contextual messaging system. For example, the content receiving device may request the contextual message based on receiving an indication identifying the beginning of the broadcast of a particular advertisement or program. For example, the indication may correspond to a cue tone received by a broadcasting system, such as video head end system and may be received by the content receiving device when receiving broadcasted content. In some implementations, the indication may identify that a contextual message, corresponding to broadcasted content, is to be provided to a user device (e.g., when an advertisement is broadcasted, or at some other time where a contextual message may be provided).

In some implementations, the content receiving device may provide program details to a contextual messaging system (e.g., as a part of a request for a contextual message associated with content currently being received by the content receiving device). In some implementations, the contextual messaging system may identify content being broadcasted at the moment the request is received, and provide a contextual message corresponding to the content being broadcasted. Alternatively, the content receiving device may provide the request independently of receiving an indication (e.g., such that a contextual message can be received at any time). In some implementations, the program details may include information identifying a particular channel (e.g., television channel) to which the content receiving device is tuned, a time, and a geographic location of the content receiving device (e.g., corresponding to a broadcasting market).

In some implementations, the contextual messaging system may identify broadcasted content based on receiving the program details (e.g., content being broadcasted via the particular channel associated with the geographic location and at the time identified by the program details). For example, the contextual messaging system may identify the broadcasted content based on a content schedule maintained by the contextual messaging system.

In some implementations (e.g., when the content schedule does not identify the broadcasted content), the contextual messaging system may perform content recognition to identify the broadcasted content (e.g., using audio/video content recognition techniques), and may update a content schedule to identify that the broadcasted content is currently being broadcasted. For example, the contextual messaging system may sample a portion of the broadcasted content to generate an audio/image fingerprint, and compare the audio/image fingerprint to a database that identifies content based on audio/image fingerprint data.

In some implementations, the contextual messaging system may sample the broadcasted content such that the user device may not need to sample the broadcasted content, thereby improving accuracy of the sample in relation to when the user device may receive ambient noise when sampling the broadcasted content or when the user device does not include sufficient processing capabilities to sample the broadcasted content.

In some implementations, the content schedule may be used to identify the broadcasted content (e.g., for additional content receiving devices that may later provide program details) without the need to perform audio/video content recognition after the content schedule has been updated to reflect that the broadcasted content is currently being broadcasted (e.g., until the broadcasted content has completed broadcasting). For example, the contextual messaging system may store information in the content schedule that identifies when the broadcasted content (e.g., an advertisement) is to be completed, may perform content recognition on subsequent broadcasted content, and update the content schedule that identifies that the subsequent broadcasted content is being broadcasted (e.g., such that that the content schedule can be used to identify the subsequent broadcasted content once the subsequent broadcasted content has been identified via content recognition). As further shown in FIG. 1, the contextual messaging system may provide a contextual message that is associated with the broadcasted content.

As a result, the contextual messaging system may identify content that is being broadcasted at a particular moment (e.g., using content recognition techniques and/or a content schedule), and may provide contextual messages, associated with the broadcasted content, to a user device connected to a common network as the content receiving device. In some implementations, the user device may receive contextual messages even when the user device is not connected to a common network as the content receiving device. For example, the user device may receive the contextual messages when the user device is registered with the content receiving device. In some implementations, the contextual messaging system may identify that the user device is registered with the content receiving device and may provide contextual messages to the user device based on broadcasted content received by the content receiving device. In some implementations, the contextual messaging system may identify the broadcasted content without relying on a broadcast schedule that may not be accurate (e.g., since the broadcast schedule may change due to marketing decisions, or interruptions to scheduled programming, or may vary for broadcasts of live events with dynamic advertisement breaks).

Figure 2:
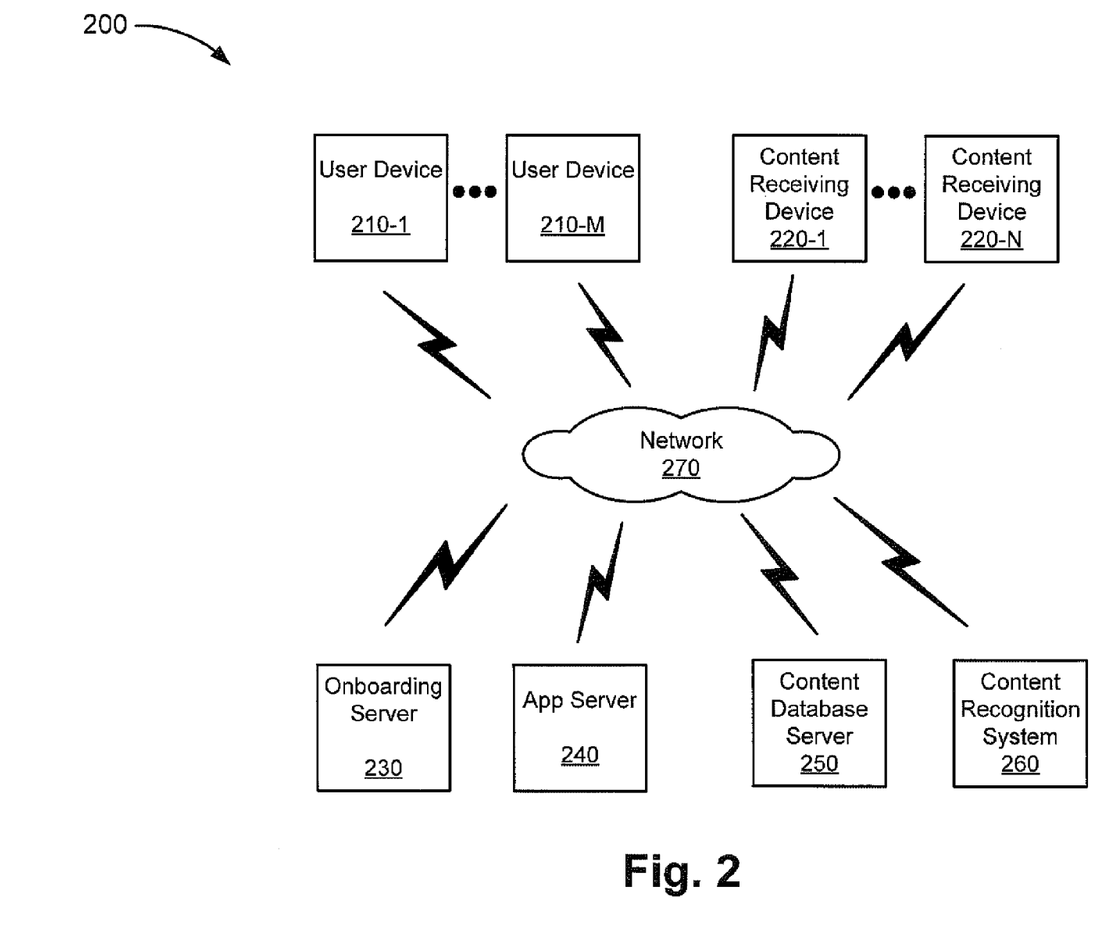
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210-1, . . . , 210-M (where M>1), content receiving device 220-1, . . . , 220-N (where N>1), onboarding server 230, application (app) server 240, content database server 250, content recognition system 260, and network 270.

User device 210 may include a device capable of communicating via a network, such as network 270. For example, user device 210 may correspond to a mobile communication device (e.g., a smart phone or a personal digital assistant (PDA)), a portable computer device (e.g., a laptop or a tablet computer), a gaming device, a desktop computing device, or another type of device. In some implementations, user device 210 may connect with content receiving device 220 over a common network and may provide an instruction to request to receive contextual messages based on particular content currently being received by content receiving device 220. In some implementations, user device 210 may include an application that may communicate with app server 240 to receive the contextual messages.

Content receiving device 220 may include one or more content receivers, such as a set-top box, a tuner, a television cable card, or the like. In some implementations, content receiving device 220 may receive broadcasted content (e.g., from a head-end system) and output the broadcasted content to a display associated with content receiving device 220. In some implementations, content receiving device 220 may provide program details to app server 240 based on receiving an instruction (e.g., from user device 210 connected to a common network as content receiving device 220) to request to receive contextual messages. In some implementations, the program details may include information identifying a particular channel (e.g., a television channel), a time, and a geographic location (e.g., a geographic location corresponding to a television market).

Onboarding server 230 may include one or more computing devices, such as a server device or a collection of server devices. In some implementations, onboarding server 230 may receive information from a content owner regarding particular content that may be broadcasted to content receiving device 220 (e.g., via a user interface of onboarding server 230 and/or a web portal that may connect to onboarding server 230). In some implementations, onboarding server 230 may receive information identifying a contextual message that is to be provided when content receiving device 220 receives the particular content. In some implementations, onboarding server 230 may store information identifying an audio/image fingerprint that may be used (e.g., by content database server 250) to identify the particular content.

App server 240 may include one or more computing devices, such as a server device or a collection of server devices. In some implementations, app server 240 may communicate with content receiving device 220 and may identify one or more user devices 210 connected to a common network as content receiving device 220. For example, app server 240 may identify an external internet protocol (IP) address of user device 210 and of content receiving device 220 and may determine that user device 210 and content receiving device 220 are connected to a common network when all or a portion of the external IP address of user device 210 and the external IP address of content receiving device 220 match. In some implementations, app server 240 may receive program details from content receiving device 220 as part of a request to provide contextual messages to user devices 210 connected to the same network as content receiving device 220.

In some implementations, app server 240 may communicate with content database server 250 and/or content recognition system 260 to identify particular content being currently broadcasted to content receiving device 220 based on the program details. For example, app server 240 may identify the particular content based on a content schedule stored by content database server 250. If information identifying the particular content is not stored by content database server 250, app server 240 may request content recognition system 260 to identify the content using an audio/image fingerprinting technique. As described in greater detail below, content database server 250 may store the information identifying the particular content in a content schedule after content recognition system 260 identifies the particular content.

Further, app server 240 may identify a particular contextual message to provide to user device 210 based on the particular content and based on information received by onboarding server 230 (e.g., information provided by a content owner that identifies the particular contextual message associated with the particular content).

Content database server 250 may include one or more computing devices, such as a server device or a collection of server devices. In some implementations, content database server 250 may store a content schedule having information identifying content that is being broadcasted and that may be received by content receiving device 220. For example, the content schedule may identify particular advertisements, television programs, or some other type of content that is being broadcasted. In some implementations, content database server 250 may store information that identifies the content based on a channel number, a geographic location (e.g., corresponding to a television market), and a time. In some implementations, information stored by content database server 250 may correspond to a broadcast schedule (e.g., of a broadcasting party that provides content for broadcast to content receiving device 220 via a video head-end system) and/or content identified by content recognition system 260.

In some implementations, the content schedule may supplement a broadcast schedule to provide a more accurate description of broadcasted content in relation to information included alone in a broadcast schedule (e.g., since the broadcast schedule may change due to marketing decisions or interruptions to scheduled programming, or may vary for broadcasts of live events with dynamic advertisement breaks). For example, content database server 250 may store information identifying that a particular advertisement is being broadcasted at a particular moment. In some implementations (e.g., when content database server 250 does not store information identifying content being broadcasted at a particular moment), content recognition system 260 may identify the content, and provide information identifying the content to content database server 250.

Content recognition system 260 may include one or more computing devices, such as a server device or a collection of server devices. In some implementations, content recognition system 260 may tune to a particular channel, associated with a particular geographic location, to receive a sample of broadcasted content associated with the particular channel, identify the broadcasted content, and provide information identifying the broadcasted content to content database server 250 (e.g., including a channel number, a time, and a geographic location associated with the broadcasted content). For example, content recognition system 260 may form an audio/image fingerprint based on the sample, and compare the audio/image fingerprint to information received by onboarding server 230 that identifies particular content corresponding to the audio/image fingerprint.

In some implementations, content recognition system 260 may sample broadcasted content based on receiving a request to identify the broadcasted content from app server 240 (e.g., when the broadcasted content is not identified in a content schedule stored by content database server 250). Additionally, or alternatively, content recognition system 260 may sample broadcasted content independently of app server 240. For example, content recognition system 260 may periodically sample broadcasted content and may provide information identifying the broadcasted content to content database server 250 (e.g., such that content database server 250 stores up-to-date information in a content schedule identifying broadcasted content). In some implementations, content recognition system 260 may identify when the broadcast of first content is to be completed (e.g., a first advertisement), and may sample second content (e.g., content broadcasted subsequent to the first content) to identify the second content after broadcast of the first content has completed.

In some implementations, content recognition system 260 may not identify the content, for example, when the content currently being broadcasted corresponds to a television program and/or content that does not have an associated contextual message and/or an audio/image fingerprint with which to identify the content.

Network 270 may include one or more wired and/or wireless networks. For example, network 270 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 270 may include a local area network (LAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
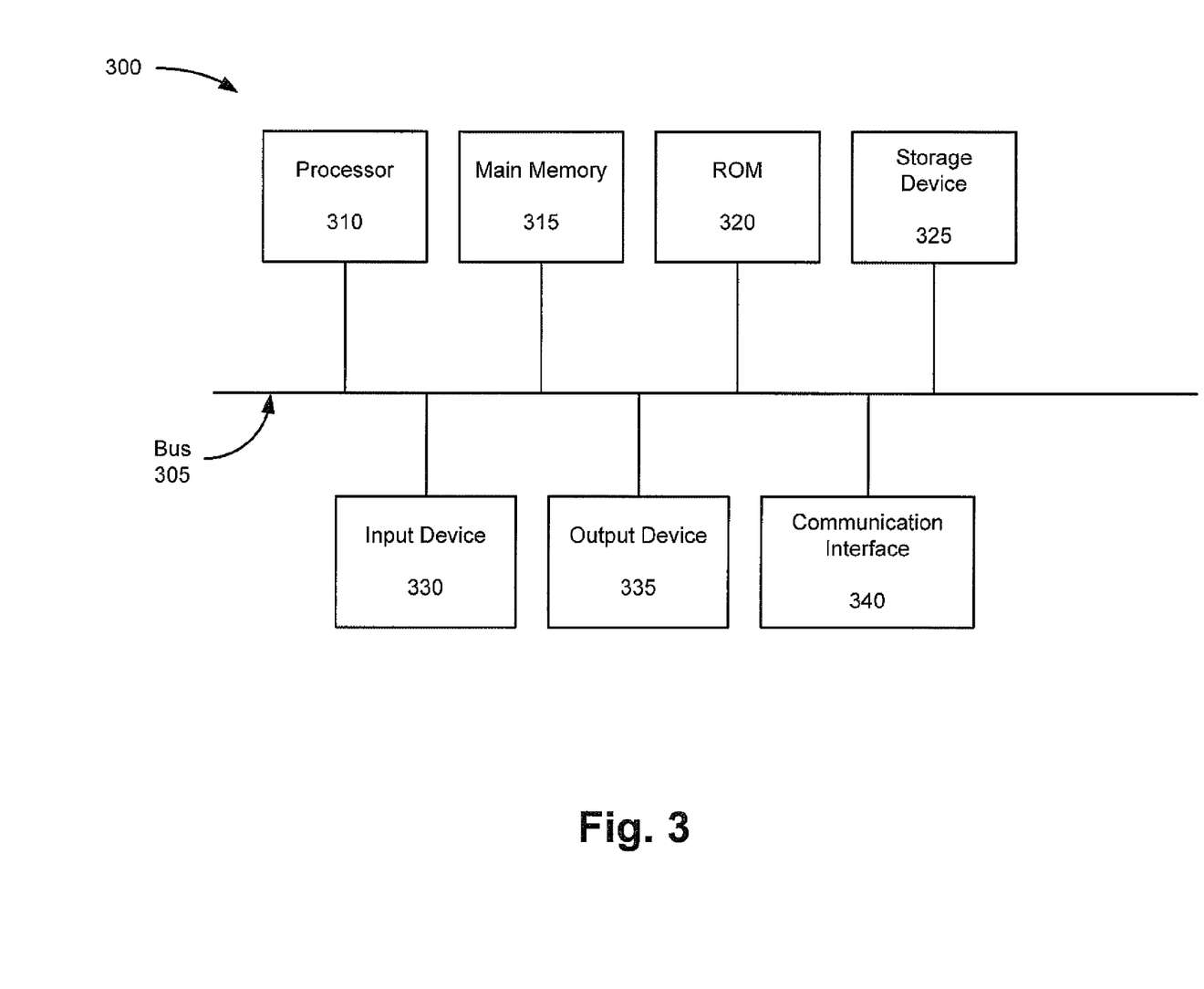
FIG. 3 illustrates example components of a device that may be used within the environment of FIG. 2.

FIG. 3 illustrates example components of a device 300 that may be used within environment 200 of FIG. 2. Device 300 may correspond to user device 210, content receiving device 220, onboarding server 230, app server 240, content database server 250 and/or content recognition system 260. Each of user device 210, content receiving device 220, onboarding server 230, app server 240, content database server 250 and/or content recognition system 260 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like component that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3.

Figure 4:
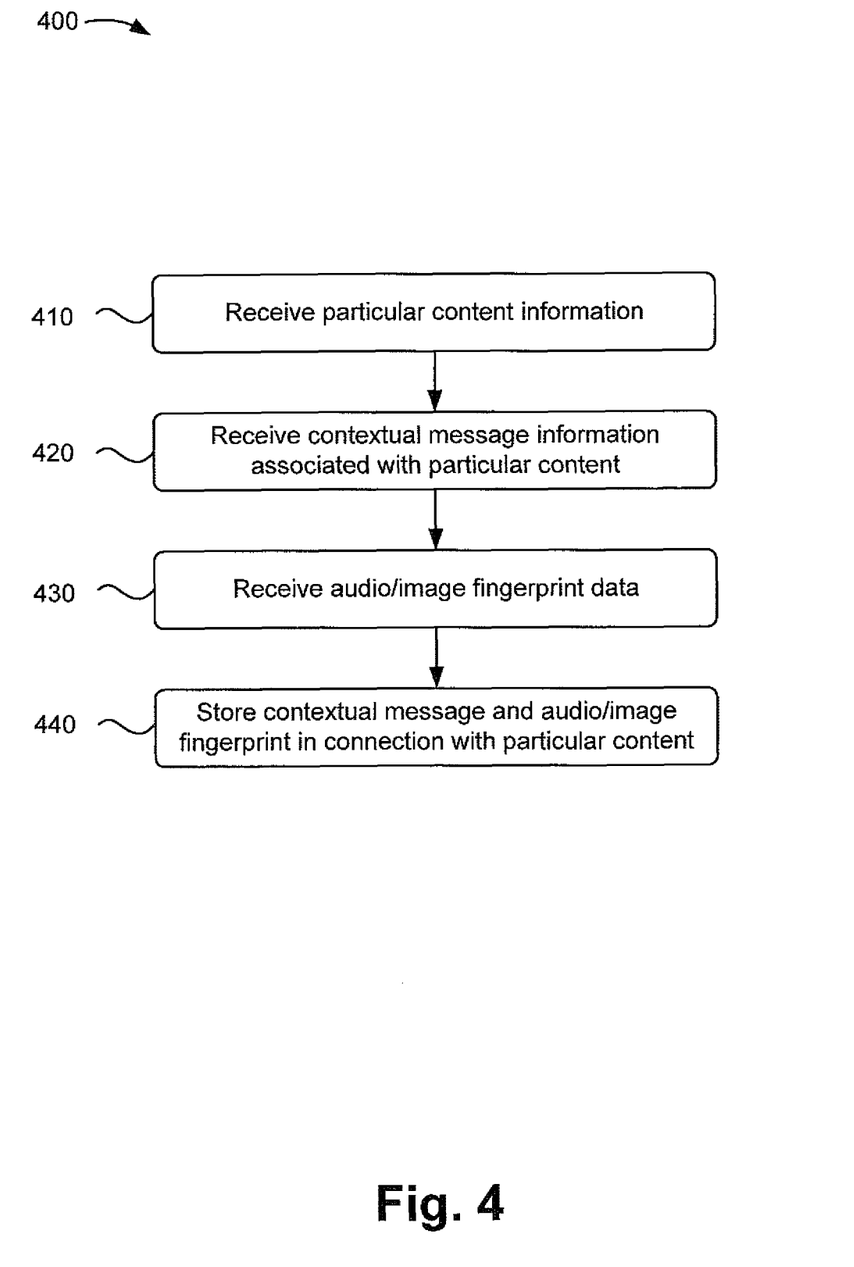
FIG. 4 illustrates a flowchart of an example process for storing contextual messages and audio/image fingerprint data in connection with particular content.

FIG. 4 illustrates a flowchart of an example process 400 for storing contextual messages and audio/image fingerprint data in connection with particular content. In one implementation, process 400 may be performed by one or more components of content database server 250. In another implementation, some or all of blocks of process 400 may be performed by one or more components of another device in environment 200 (e.g., user device 210, onboarding server 230, app server 240 and/or content recognition system 260), or a group of devices including or excluding content database server 250.

As shown in FIG. 4, process 400 may include receiving particular content information (block 410). For example, content database server 250 may receive information identifying particular content from onboarding server 230. In some implementations, a content owner may access onboarding server 230 to provide the information identifying the content as part of an on-boarding process to provide a contextual message, associated with the particular content, to content receiving device 220 when content receiving device 220 receives the particular content.

Process 400 may also include receiving contextual message information associated with content (block 420). For example, content database server 250 may receive the contextual message information from onboarding server 230 in connection with the particular content. In some implementations, the content owner may access onboarding server 230 to provide the contextual message information as part of the on-boarding process. As described above, the contextual message information may include a link, an instruction, or some other type of message that is to be delivered to content receiving device 220 when content receiving device 220 receives the particular content.

Process 400 may further include receiving audio/image fingerprint data (block 430). For example, content database server 250 may receive the audio/image fingerprint data, associated with the particular content, from onboarding server 230. In some implementations, the content owner may access onboarding server 230 to provide the audio/image fingerprint data as part of the on-boarding process. Additionally, or alternatively, content recognition system 260 may provide the audio/image fingerprint data, associated with the particular content, based on a broadcast schedule. For example, assume that the broadcast schedule identifies that the particular content is to be broadcast on channel 5 at 12:00:00. Given this assumption, content recognition system 260 may receive content from channel 5 at 12:00:00, generate an audio/image fingerprint, and provide the audio/image fingerprint for the particular content to content database server 250.

Process 400 may also include storing the contextual message and audio/image fingerprint in connection with the particular content (block 440). For example, content database server 250 may store (e.g., in a data structure) information that links the particular content with the audio/image fingerprint and the contextual message. As described in greater detail below, app server 240 may communicate with content recognition system 260 to generate an audio/image fingerprint of content currently being received by content receiving device 220 and identify the particular content corresponding to the audio/image fingerprint (e.g., based on information stored by content database server 250). Further, app server 240 may access content database server 250 to identify a contextual message associated with the identified particular content and may provide the contextual message to user device 210.

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel.

Figure 5:
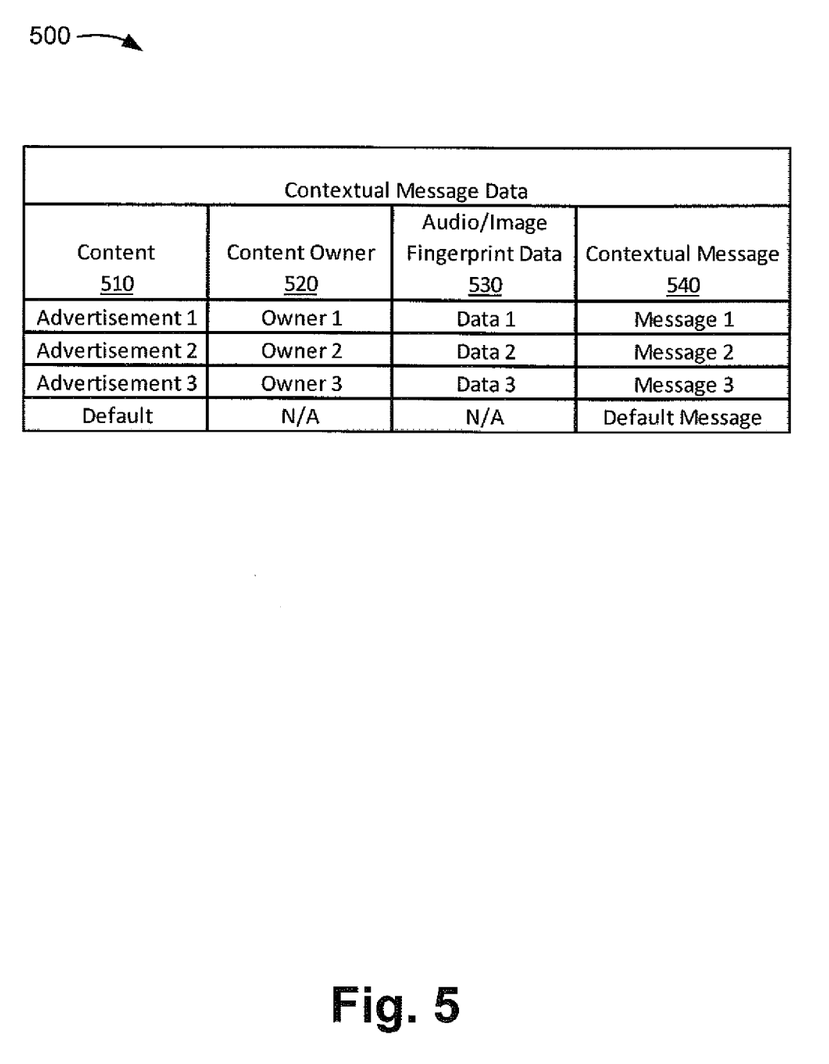
FIG. 5 illustrates an example data structure that may be stored by one or more devices in the environment of FIG. 2.

FIG. 5 illustrates an example data structure 500 that may be stored by one or more devices in environment 200, such as onboarding server 230, app server 240, and/or content database server 250. In some implementations, data structure 500 may be stored in a memory of onboarding server 230, app server 240, and/or content database server 250. In some implementations, data structure 500 may be stored in a memory separate from, but accessible by, onboarding server 230, app server 240, and/or content database server 250. In some implementations, data structure 500 may be stored by some other device in environment 200, such as user device 210, content receiving device 220, and/or content recognition system 260. A particular instance of data structure 500 may contain different information and/or fields than another instance of data structure 500.

Data structure 500 may include information identifying contextual messages that are to be provided when particular content is received by content receiving device 220. For example, each entry in data structure 500 may identify particular content, an owner of the particular content (e.g., a content owner), audio/image fingerprint data that may be used (e.g., by content recognition system 260) to identify the particular content (e.g., when the particular content is broadcasted at a particular moment), and a contextual message associated with the particular content (e.g., a contextual message to be provided when the particular content is broadcasted).

As shown in FIG. 5, data structure 500 may include content field 510, content owner field 520, audio/image fingerprint data field 530, and contextual message field 540.

Content field 510 may store information identifying particular content that may be received by content receiving device 220 (e.g., via a broadcasting system). For example, content field 510 may store information identifying an advertisement, a television program, a public service announcement, or some other content that may be associated with a contextual message that may be provided when the content is received by content receiving device 220. In some implementations, content field 510 may further store information identifying a time length of the content (e.g., information identifying that the content is 30 seconds in length, 60 seconds in length, 20 minutes in length, etc.).

Content owner field 520 may store information identifying a particular owner of content identified in content field 510.

For example, content owner field 520 may store a name of the content owner, account information of the content owner, and/or some other information regarding the content owner (e.g., authentication information that the content owner may use to access onboarding server 230 to provide contextual messaging information).

Audio/image fingerprint data field 530 may include a string of characters corresponding to a checksum value or some other value identifying audio/image data associated with the content. As described in greater detail below, content recognition system 260 may generate an audio/image fingerprint associated with particular content, and may identify the particular content when the generated audio/image fingerprint matches (or approximately matches) an audio/image fingerprint stored by audio/image fingerprint data field 530 (e.g., via approximate string matching techniques or some other technique).

Contextual message field 540 may store information identifying a link, an instruction, an image, a video, and/or some other information corresponding to a contextual message that may be provided when corresponding content is received by content receiving device 220.

In some implementations, data structure 500 may store information identifying a default message that may be provided to user device 210 when an associated content receiving device 220 is currently receiving default content (e.g., unidentified content indicating that a television program is currently being broadcasted and/or content that does not have an associated contextual message). In some implementations, data structure 500 may not include information regarding a content owner and/or audio/image fingerprint data for default content (e.g., since the default content may correspond to content that is unidentified by content recognition system 260).

In some implementations, information stored by data structure 500 may be received by onboarding server 230 from a content owner (e.g., via a user interface of onboarding server 230, a web portal associated with onboarding server 230, or via some other technique). For example, the content owner may access onboarding server 230, provide information identifying content, audio/image fingerprint data associated with the content, and a contextual message that is to be provided to user device 210 when content receiving device 220 receives the content.

In some implementations, information stored by audio/image fingerprint data field 530 may be based on a broadcast schedule. For example, assume that the broadcast schedule identifies that Advertisement 1 is to be broadcast on channel 5 at 12:00:00. Given this assumption, content recognition system 260 may receive content from channel 5 at 12:00:00, generate an audio/image fingerprint, and provide the audio/image fingerprint for Advertisement 1 for storage in audio/image fingerprint field 530.

While particular fields are shown in a particular format in data structure 500, in practice, data structure 500 may include additional fields, fewer fields, different fields, or differently arranged fields than are shown in FIG. 5. Also, FIG. 5 illustrates examples of information stored by data structure 500. In practice, other examples of information stored by data structure 500 are possible.

Figure 6:
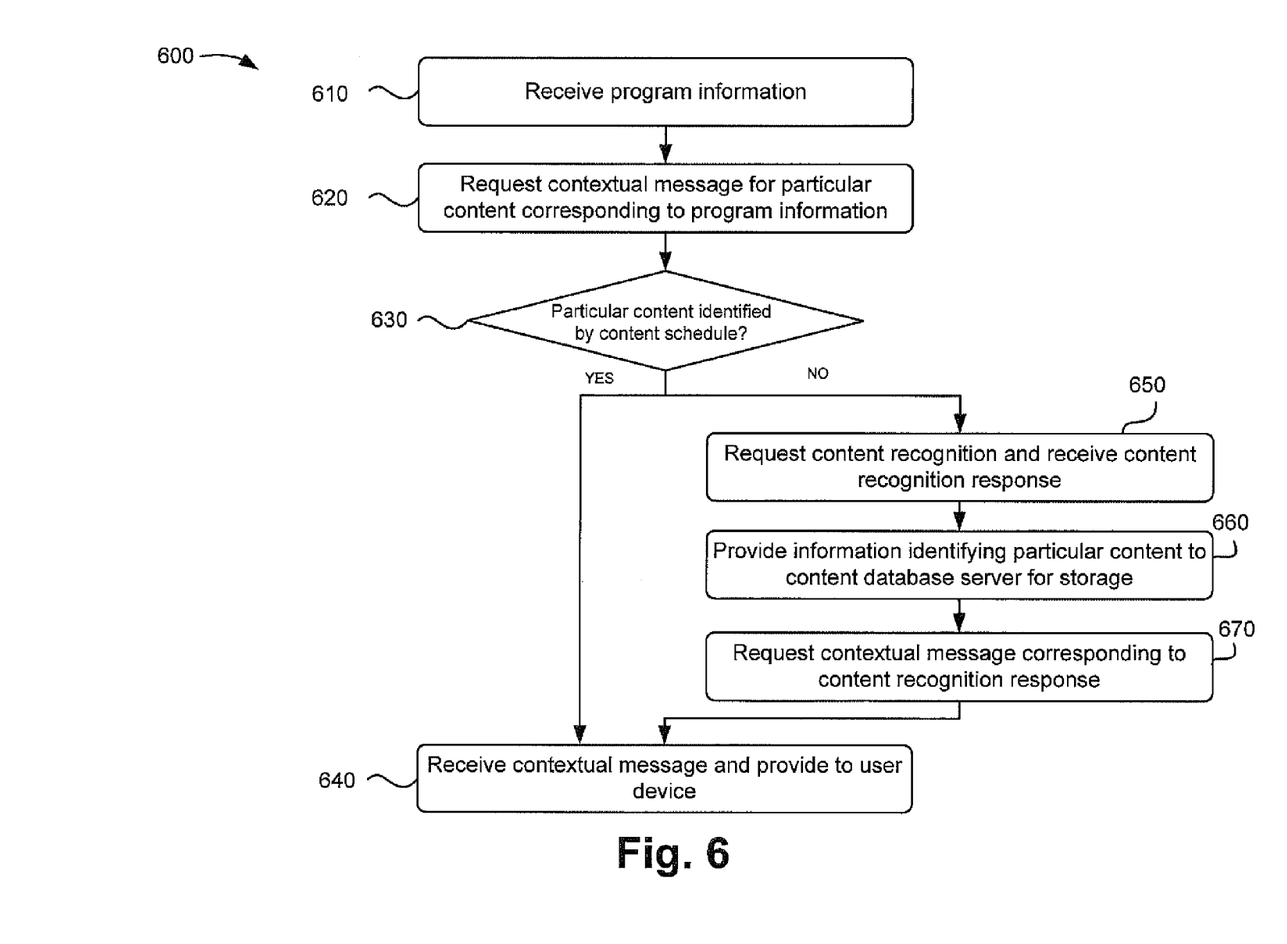
FIG. 6 illustrates a flowchart of an example process for determining a contextual message to provide to a user device based on content currently being accessed by a content receiving device.

FIG. 6 illustrates a flowchart of an example process 600 for determining a contextual message to provide to a user device based on content currently being accessed by a content receiving device. In one implementation, process 600 may be performed by one or more components of app server 240. In another implementation, some or all of blocks of process 600 may be performed by one or more components of another device in environment 200 (e.g., user device 210, onboarding server 230, content database server 250 and/or content recognition system 260), or a group of devices including or excluding app server 240.

As shown in FIG. 6, process 600 may include receiving program information (block 610). For example, app server 240 may receive program information from content receiving device 220 as part of a request to provide a user device 210, associated with content receiving device 220, with a contextual message corresponding to content currently being received by content receiving device 220. In some implementations, content receiving device 220 may provide the program information when user device 210 connects with content receiving device 220 and selects to receive contextual messages.

In some implementations, user device 210 may execute an application that may be used to communicate with content receiving device 220 to select to receive the contextual messages. In some implementations, app server 240 may connect with user device 210 when user device 210 executes the application to communicate with content receiving device 220. In some implementations, app server 240 may identify that user device 210 is connected with content receiving device 220 and that user device 210 is connected to a common network as content receiving device 220 or is associated with content receiving device 220 in some other manner (e.g., when user device 210 is registered with content receiving device 220). For example, when receiving the program information, app server 240 may identify an external IP address of content receiving device 220. Further, when connecting with user device 210, app server 240 may identify an external IP address of user device 210. In some implementations, app server 240 may determine that user device 210 and content receiving device 220 are connected to a common network when all or a portion of the external IP of user device 210 and of content receiving device 220 match.

In some implementations, content receiving device 220 may provide the program information in response to receiving an indication (e.g., corresponding to a cue tone or some other indication that an advertisement or program has started broadcasting). Additionally, or alternatively, content receiving device 220 may provide the program information independently of receiving the indication (e.g., such that a contextual message can be provided to user device 210 at some other time). In some implementations, the program information may include information identifying a particular channel (e.g., a television channel) to which content receiving device 220 is tuned, a time, and a geographic location of content receiving device 220 (e.g., corresponding to a broadcasting market).

Process 600 may further include requesting a contextual message for particular content corresponding to program information (block 620). For example, app server 240 may provide the program information to content database server 250 to request the contextual message for the particular content corresponding to the program information. In some implementations, content database server 250 may store a content schedule that identifies content being broadcasted via a particular channel at a particular time and associated with a geographic location. In some implementations, the content schedule may store information identifying content when the content is identified (e.g., via a broadcast schedule and/or via content recognition system 260).

In some implementations, content database server 250 may identify the particular content (e.g., based on the content schedule) corresponding to the particular channel, the particular time, and the geographic location associated with the program information received from app server 240. In some implementations, the content schedule may not store information identifying the particular content, for example, when the particular content has not been determined.

In some implementations, content database server 250 may provide a response to app server 240 based on receiving the request for the contextual message. For example, when information identifying the particular content is stored by a content schedule, content database server 250 may provide a response that identifies the content. Further, the response may include the contextual message, corresponding to the identified content, based on information stored by data structure 500. In some implementations (e.g., when information identifying the particular content is not stored by the content schedule), content database server 250 may provide a response that that the content is not identified.

Process 600 may further include determining whether the particular content is identified by the content schedule (block 630). For example, based on the response received from content database server 250, app server 240 may determine whether the particular content is identified by the content schedule.

If, for example, the particular content is identified by the content schedule (block 630—YES), process 600 may further include receiving the contextual message and providing the contextual message to a user device (block 640). For example, app server 240 may receive the contextual message, corresponding to the particular content, as part of a response from content database server 250 for the request for the contextual message.

In some implementations, app server 240 may identify a user device 210 that is currently connected to app server 240 (e.g., via an application running on user device 210 that is used to receive contextual messages) and is associated with content receiving device 220 (e.g., a user device 210 connected to a common network as content receiving device 220, registered to content receiving device 220, and/or associated with content receiving device 220 in some other manner). In some implementations, app server 240 may provide the contextual message to user device 210. In some implementations, the contextual message may include one or more links to webpages with information relating to particular content currently being received by content receiving device 220. Additionally, or alternatively, the contextual message may include one or more instructions to direct user device 210 to open an application or perform some other task that may be related to the particular content currently being received by content receiving device 220.

If, on the other hand, the particular content is not identified by the content schedule (block 630—NO), process 600 may also include requesting content recognition and receiving a content recognition response (block 650). For example, app server 240 may provide a request (e.g., to content recognition system 260) for identification of the content. In some implementations, the request may include the program information received from content receiving device 220. In some implementations, content recognition system 260 may receive the particular content, associated with the channel and geographic location identified in the program information (e.g., by tuning to the channel associated with the geographic location) and form an audio/image fingerprint of the particular content. Additionally, or alternatively, content receiving device 220 may generate an audio/image fingerprint and provide the audio/image fingerprint to content recognition system 260.

In some implementations, content recognition system 260 may compare the audio/image fingerprint with audio/image fingerprints stored by data structure 500 and/or by an audio/image fingerprint database. In some implementations, content recognition system 260 may identify the particular content whose audio/image fingerprint matches the audio/image fingerprint generated by content recognition system 260 to a particular degree and may provide a content recognition response (e.g., to app server 240) including information that identifies the particular content based on the audio/image fingerprint.

Process 600 may further include providing information identifying the particular content to the content database server for storage (block 660). For example, app server 240 may provide the information identifying the particular content (e.g., based on receiving the content recognition response) to content database server 250. In some implementations, content database server 250 may store information in the content schedule, maintained by content database server 250, that identifies that particular content is currently being broadcasted. As described in greater detail below with respect to FIG. 7, the content schedule may identify how long content is to be broadcasted such that content database server 250 may identify the content from the content schedule and so that app server 240 may not need to request content recognition from content recognition system 260, thereby saving resources associated with requesting content recognition.

Process 600 may also include requesting a contextual message corresponding to the content recognition response (block 670). For example, app server 240 may request, from content database server 250, information identifying a contextual message corresponding to the particular content identified in the content recognition response. In some implementations, content database server 250 may identify the contextual message based on information stored by data structure 500. In some implementations, app server 240 may receive the contextual message and provide the contextual message to user device 210 (e.g., in accordance with block 640 described above).

As described above, app server 240 may provide information identifying particular content (e.g., after receiving content recognition response from content recognition system 260) to content database server 250 such that content database server 250 may store the information identifying the particular content in a content schedule (thereby allowing the content to be identified via the content schedule instead of via content recognition). As an example, assume that the particular content is an advertisement (e.g., Advertisement ABC) that is 30 seconds in length. Further, assume that the content is identified at the time of 12:00:00 (e.g., when content receiving device 220 receives an indication corresponding to a cue tone and provides program information as part of a request for a contextual message). Given these assumptions, the content schedule may store information identifying Advertisement ABC may be broadcasted from 12:00:00 to 12:00:30 on the particular channel associated with the particular geographic location.

Continuing with the above example, assume that, at 12:00:15, another content receiving device 220 provides program information to request a contextual message corresponding to particular content associated with a particular channel and geographic location (e.g., in accordance with block 610). Given this assumption, the content database server 250 may identify (e.g., based on the content schedule) that Advertisement ABC is currently being broadcasted such that blocks 650-670 may be omitted, thereby reducing resources associated with performing content recognition.

In some implementations, the content schedule may be used to identify the particular content when potentially tens of thousands, or millions of content receiving devices 220 request contextual messages during a given advertisement broadcasting window, thereby saving resources such that content recognition via content recognition system 260 may not need to be performed for each contextual message request. For example, content recognition system 260 may need to perform content recognition only after the first content receiving device 220, of multiple content receiving devices 220, requests a contextual message. For subsequent content receiving devices 220 that request contextual messages after the first content receiving device 220 requests a contextual message within a particular advertising time window, the content may be identified using the content schedule.

In some implementations, (e.g., when multiple content receiving devices 220 are tuned to the same channel, associated with the same geographic location, at the same time), some content receiving devices 220 may experience a broadcasting delay, relative to other content receiving devices 220, in receiving content and requesting contextual messages. For those content receiving devices 220 that experience a broadcasting delay, the content schedule may be used to identify particular content being received by content receiving device 220 (e.g., instead of identifying the particular content via audio/image fingerprinting by content recognition system 260). Further, the content schedule may be used to identify particular content that is stored by content receiving device 220 and played back after an original broadcast (e.g., recorded content).

In some implementations, blocks 650-660 may be performed by content database server 250 independently of app server 240. For example, content database server 250 may request content recognition after a first advertisement is scheduled to complete broadcast and may store information in the content schedule that identifies a second advertisement that is broadcast after the first advertisement. In some implementations, content database server 250 may receive an indication (e.g., from a broadcasting system), indicating the start of an advertisement broadcast, may request content recognition from content recognition system 260 based on receiving the indication, and may store information in the content schedule when content recognition system 260 provides a content recognition response identifying the content. That is, either app server 240 or content database server 250 may request content recognition from content recognition system 260.

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel.

Figure 7:
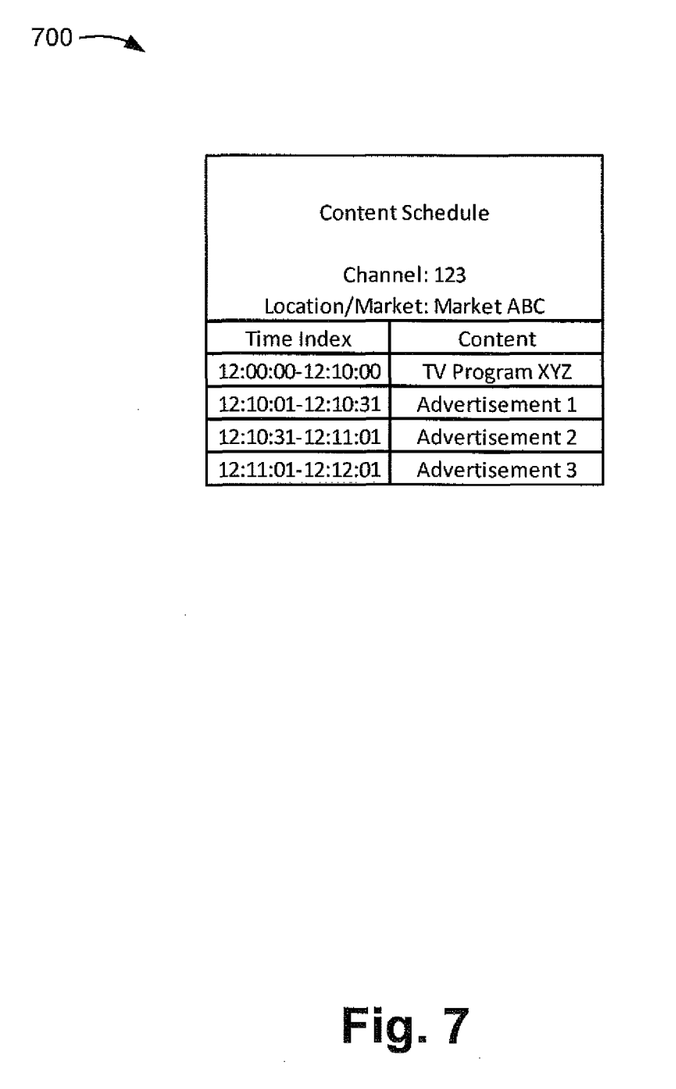
FIG. 7 illustrates an example data structure that may be stored by one or more devices in the environment of FIG. 2.

FIG. 7 illustrates an example data structure 700 that may be stored by one or more devices in environment 200, such as content database server 250. In some implementations, data structure 700 may be stored in a memory of content database server 250. In some implementations, data structure 700 may be stored in a memory separate from, but accessible by, content database server 250. In some implementations, data structure 700 may be stored by some other device in environment 200, such as user device 210, content receiving device 220, onboarding server 230, app server 240, and/or content recognition system 260. A particular instance of data structure 700 may contain different information and/or fields than another instance of data structure 700.

In some implementations, data structure 700 may correspond to information included in a content schedule associated with a particular channel and a particular geographic location and/or broadcasting market. Another instance of data structure 700 may correspond to information included in a content schedule associated with another channel and another geographic location and/or broadcasting market. In the example shown in FIG. 7, data structure 700 may include a content schedule for content being broadcasted via the particular channel, Channel 123, associated with the geographic location corresponding to the broadcasting market, Market ABC.

As shown in FIG. 7, data structure 700 may store information identifying content being broadcasted at different time indexes via the particular channel associated with the geographic location. In the example shown in FIG. 7, data structure 700 may identify that during time index 12:00:00-12:10:00, a television program (e.g., TV Program XYZ) was broadcasted. Further, data structure 700 may identify that during the time index 12:10:01-12:10:30, an advertisement (e.g., Advertisement 1) was broadcasted. In some implementations, the last entry in data structure 700 may identify a scheduled broadcast of content currently being broadcasted.

In some implementations, information stored by data structure 700 may correspond to information associated with a broadcasting schedule. Additionally, information stored by data structure 700 may correspond to a content recognition response provided by content recognition system 260. In the example shown in FIG. 7, a broadcasting schedule may identify that TV Program XYZ is scheduled to broadcast from 12:00:00-12:10:00 and that an advertisement block is scheduled between 12:10:01-12:12:01. Content recognition responses, provided by content recognition system 260, may identify particular advertisements broadcasted during the advertisement block. For example, assume that at 12:10:01, content recognition system 260 provides a content recognition response (e.g., in response to a content recognition request provided by app server 240 and/or content database server 250) that identifies that Advertisement 1 is being broadcasted. Further, assume that Advertisement 1 is 30 seconds in length (e.g., based on content information stored by data structure 500). Given these assumptions, data structure 700 may store information identifying that Advertisement 1 is broadcasted from 12:10:01-12:10:31.

Continuing with the above example, assume that at 12:10:31, content recognition system 260 provides a content recognition response (e.g., in response to a content recognition request provided by app server 240 and/or content database server 250) that identifies that Advertisement 2 is being broadcasted. Further, assume that Advertisement 2 is 30 seconds in length (e.g., based on content information stored by data structure 500). Given these assumptions, data structure 700 may store information identifying that Advertisement 2 is broadcasted from 12:10:31-12:11:01.

Continuing with the above example, assume that at 12:11:01, content recognition system 260 provides a content recognition response that identifies that Advertisement 3 is being broadcasted. Further, assume that Advertisement 3 is 60 seconds in length (e.g., based on content information stored by data structure 500). Given these assumptions, data structure 700 may store information identifying that Advertisement 3 is broadcasted from 12:11:01-12:12:01.

While particular fields are shown in a particular format in data structure 700, in practice, data structure 700 may include additional fields, fewer fields, different fields, or differently arranged fields than are shown in FIG. 7. Also, FIG. 7 illustrates examples of information stored by data structure 700. In practice, other examples of information stored by data structure 700 are possible.

Figure 8A:
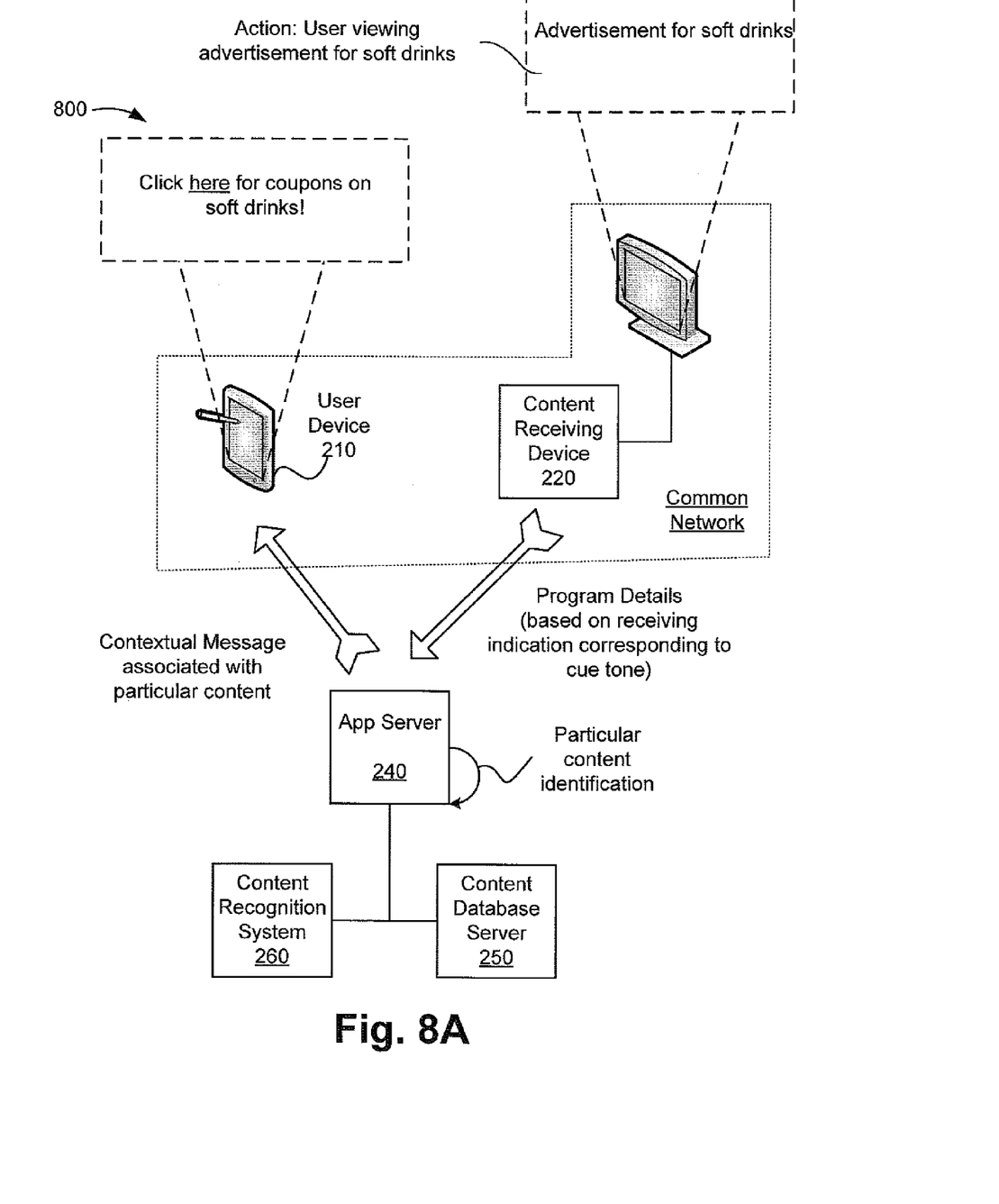
FIGS. 8A-8B illustrate example implementations as described herein.
Figure 8B:
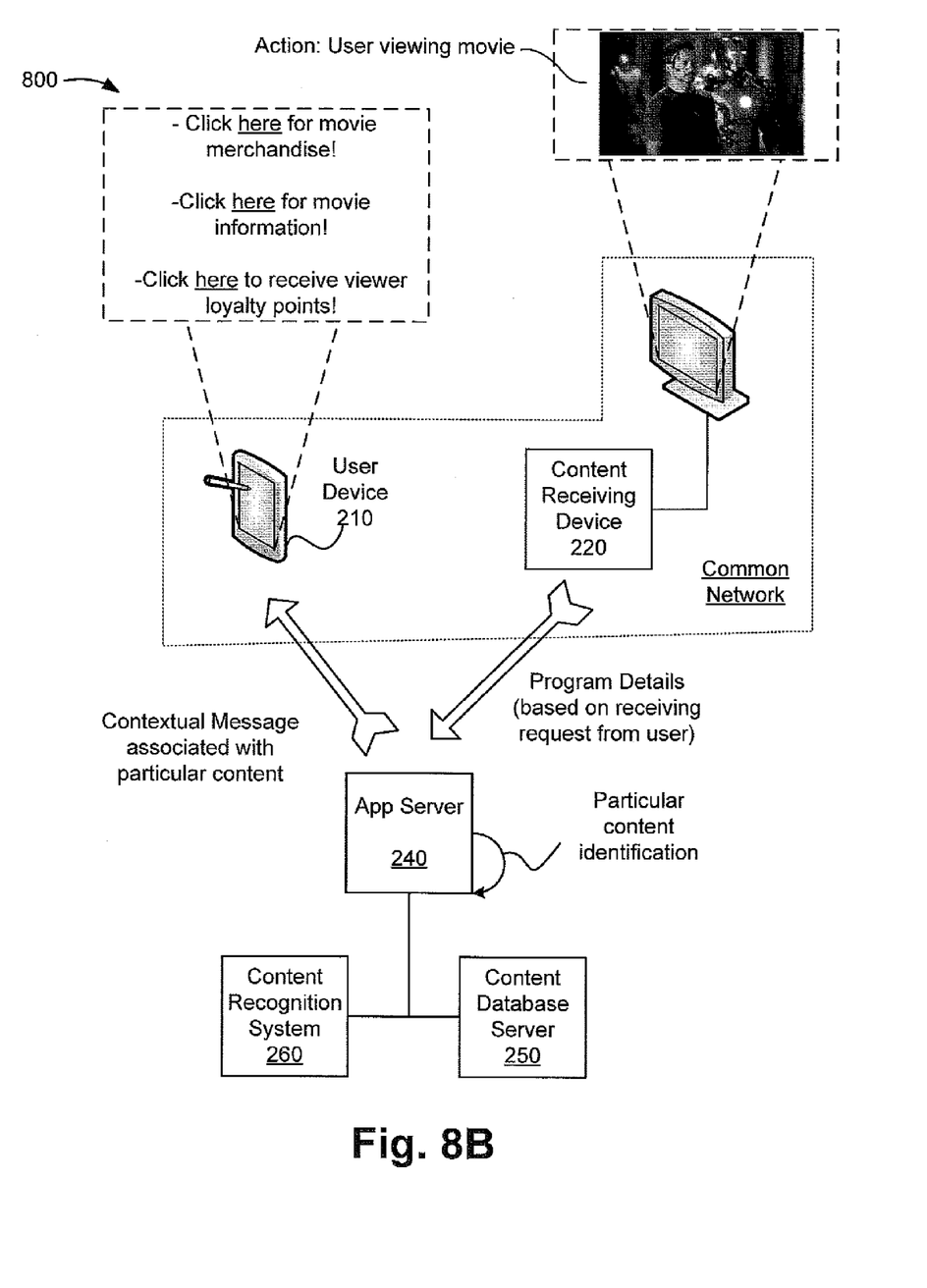

FIGS. 8A-8B illustrate example implementations as described herein. In FIG. 8A, assume that a user is currently viewing an advertisement for soft drinks on a display associated with content receiving device 220 that is receiving the advertisement via a broadcasting system. Further, assume that content receiving device 220 receives an indication (e.g., corresponding to a cue tone) that the advertisement has begun broadcasting. Further, assume that content receiving device 220 and user device 210 are connected to a common network and that user device 210 is running an application to receive contextual messages. Given these assumptions, content receiving device 220 may provide program details (e.g., as part of a contextual message request) based on receiving the indication. In some implementations, app server 240 may identify particular content being broadcasted to content receiving device 220 at the time the request for the contextual message is received. As described above with respect to FIG. 6, app server 240 may communicate with content database server 250 and/or content recognition system 260 to identify the particular content and request the contextual message corresponding to the particular content. For example, app server 240 may provide the program details to content database server 250 such that content database server 250 may identify the particular content in a content schedule.

If the particular content is identified in the content schedule, content database server 250 may provide a response that includes the contextual message corresponding to the particular content and app server 240 may provide the contextual message to user device 210. If the particular content is not identified in the content schedule, app server 240 may request content recognition from content recognition system 260, receive a content recognition response from content recognition system 260 that identifies the particular content, and provide information identifying the particular content to content database server 250 such that content database server 250 may store the information identifying the particular content in the content schedule (e.g., such that the content schedule may later be used to identify the particular content without involving content recognition system 260). Further, app server 240 may request the contextual message (e.g., from content database server 250) corresponding to the particular content and provide the contextual message to user device 210. As shown in interface 800 of user device 210, the contextual message may include a message having a link to promotions for a product in the advertisement.

Referring to FIG. 8B, assume that a user is currently viewing a movie on a display associated with content receiving device 220 that is receiving the movie via a broadcasting system. Further, assume that content receiving device 220 and user device 210 are connected to a common network and that user device 210 is running an application to receive contextual messages. Further, assume that content receiving device 220 receives a request (e.g., from a user of content receiving device 220 via a user interface of content receiving device 220) for a contextual message. Given these assumptions, content receiving device 220 may provide program details (e.g., as part of a contextual message request) based on receiving the user's request. As described above, app server 240 may identify that the movie is currently being broadcasted to content receiving device 220 (e.g., via communications with content database server 250 and/or content recognition system 260), and may provide a contextual message to user device 210 corresponding to the movie. As shown in interface 800, the contextual message may include a message having a link to merchandise associated with the movie, a link to movie information, and a link to receive viewer loyalty points (e.g., as part of a viewer rewards program).

While particular examples are shown in FIGS. 8A-8B, the above description is merely an example implementations. In practice, other examples are possible from what is described above in FIGS. 8A-8B. Also, while a particular format of interface 800 is shown, in practice, interface 800 may have a different format and appearance than what is shown in FIGS. 8A-8B.

As described above, the content that is being broadcasted at a particular moment may be identified (e.g., using content recognition techniques and/or a content schedule). Further, contextual messages, associated with the broadcasted content, may be provided to user device 210 connected to a common network as content receiving device 220. In some implementations, user device 210 may receive contextual messages even when user device 210 is not connected to a common network as content receiving device 220. For example, user device 210 may receive the contextual messages when user device 210 is registered with content receiving device 220. In some implementations, app server 240, content database server 250, and/or content recognition system 260 may identify the broadcasted content without relying on a broadcast schedule that may not be accurate (e.g., since the broadcast schedule may change due to marketing decisions or interruptions to scheduled programming, or may vary for broadcasts of live events with dynamic advertisement breaks).

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
receiving, by one or more first devices and from a second device, program information as part of a request to provide a contextual message, associated with particular content corresponding to the program information, to a third device,
the third device being different than the one or more first devices and the second device,
the program information identifying a time, a geographic location of the second device, and a television channel identifier of a channel to which the second device is tuned,
the television channel identifier being associated with the particular content;
causing, by the one or more first devices, the particular content to be identified based on a fingerprint of the particular content;
receiving, by the one or more first devices, the contextual message associated with the particular content that was identified based on the fingerprint of the particular content;
providing, by the one or more first devices, the contextual message to the third device; and
providing, by the one or more first devices and for storage in a content schedule, information identifying the particular content, a time period during which the particular content is to be broadcasted, the geographic location, and the television channel identifier, associated with the particular content,
the content schedule being used to identify the particular content without identifying the particular content based on the fingerprint after the particular content has been initially identified based on the fingerprint.

2. The method of claim 1, further comprising:
determining that the third device is connected to a same network as the second device,
where providing the contextual message to the third device is based on determining that the third device is connected to the same network as the second device.

3. The method of claim 1, further comprising:
determining that the third device is registered to the second device,
where providing the contextual message to the third device is based on determining that the third device is registered to the second device.

4. The method of claim 1, where the contextual message includes a link to merchandise associated with the particular content, a link to information associated with the particular content, a link to a rewards program, or an instruction to cause the third device to perform a task.

5. The method of claim 1, further comprising:
generating the fingerprint based on a portion of the particular content,
where the fingerprint includes an audio/image fingerprint generated based on the portion of the particular content;
comparing the fingerprint to a database of a plurality of fingerprints;
identifying that the fingerprint matches a particular one of the plurality of fingerprints; and
identifying the particular content associated with the particular one of the plurality of fingerprints.

6. The method of claim 5, further comprising:
receiving broadcasted content associated with the television channel identifier, the time, and the geographic location,
where generating the fingerprint is based on receiving the broadcasted content.

7. The method of claim 1, further comprising:
receiving the program information from a fourth device, as a request to provide the contextual message to a fifth device, after receiving the program information from the second device and after providing the information identifying the particular content for storage in the content schedule;
identifying the particular content from the content schedule;
identifying the contextual message associated with the particular content; and
providing the contextual message to the fifth device.

8. The method of claim 1, further comprising:
receiving information from a fourth device that associates the particular content with the contextual message,
where identifying the contextual message associated with the particular content is based on receiving the information that associates the particular content with the contextual message.

9. A system comprising:
one or more first devices to:
receive, from a second device, program information as part of a request to provide a contextual message, associated with particular content corresponding to the program information, to a third device,
the third device being different than the one or more first devices and the second device,
the program information identifying a time, a geographic location of the second device, and a television channel identifier of a channel to which the second device is tuned,
the television channel identifier being associated with the particular content;
cause the particular content to be identified based on a fingerprint of the particular content;
receive the contextual message associated with the particular content that was identified based on the fingerprint of the particular content;
provide the contextual message to the third device;
provide, for storage in a content schedule, information identifying the particular content, a time period during which the particular content is to be broadcasted, the geographic location, and the television channel identifier associated with the particular content,
the content schedule being used to identify the particular content without identifying the particular content based on the fingerprint after the particular content has been initially identified based on the fingerprint;
receive the program information from a fourth device, as a request to provide the contextual message to a fifth device, after receiving the program information from the second device and after providing the information identifying the particular content for storage in the content schedule;
identify the particular content from the content schedule;

identify the contextual message associated with the particular content; and
provide the contextual message to the fifth device.

10. The system of claim 9, where the one or more first devices are further to:
determine that the third device or the fifth device is connected to a same network as the second device or the fourth device,
where, when providing the contextual message to the third device or the fifth device, the one or more first devices are to provide the contextual message based on determining that the third device or the fifth device is connected to the same network as the second device or the fourth device.

11. The system of claim 9, where the one or more first devices are further to:
determine that the third device or the fifth device is registered to the second device or the fourth device,
where, when providing the contextual message to the third device or the fifth device, the one or more first devices are to provide the contextual message based on determining that the third device or the fifth device is registered to the second device or the fourth device.

12. The system of claim 9, where the contextual message includes a link to merchandise associated with the particular content, a link to information associated with the particular content, a link to a rewards program, or an instruction to cause the third device or the fifth device to perform a task.

13. The system of claim 9, where the one or more first devices are further to:
generate the fingerprint;
compare the fingerprint to a database of a plurality of fingerprints;
identify that the fingerprint matches a particular one of the plurality of fingerprints; and
identify the particular content associated with the particular one of the plurality of fingerprints.

14. The system of claim 13, where the one or more first devices are further to:
receive broadcasted content associated with the television channel identifier, the time, and the geographic location,
where, when generating the fingerprint, the one or more first devices are to generate the fingerprint based on receiving the broadcasted content.

15. The system of claim 9, where the one or more first devices are further to:
receive information from a sixth device that associates the particular content with the contextual message,
where, when identifying the contextual message associated with the particular content, the one or more first devices are to identify the contextual message associated with the particular content based on receiving the information that associates the particular content with the contextual message.

16. A computer-readable medium for storing instructions, the instructions comprising:
a plurality of instructions which, when executed by one or more processors associated with one or more first devices, cause the one or more processors to:
receive, from a second device, program information as part of a request to provide a contextual message, associated with particular content corresponding to the program information, to a third device,
the third device being different than the one or more first devices and the second device,
the program information identifying a time, a geographic location of the second device, and a television channel identifier of a channel to which the second device is tuned,
the television channel identifier being associated with the particular content;
generate a fingerprint of the particular content;
compare the fingerprint to a database of a plurality of fingerprints;
identify that the fingerprint matches a particular one of the plurality of fingerprints;
identify the particular content associated with the particular one of the plurality of fingerprints,
identify the contextual message associated with the particular content;
provide the contextual message to the third device; and
store, in a content schedule, information identifying the particular content, a time period during which the particular content is to be broadcasted, the geographic location, and the television channel identifier associated with the particular content,
the content schedule being used to identify the particular content without identifying the particular content based on the fingerprint after the particular content has been initially identified based on the fingerprint.

17. The computer-readable medium of claim 16, where the plurality of instructions further cause the one or more processors to:
determine that the third device is connected to a same network as the second device,
where one or more instructions, of the plurality of instructions, to provide the contextual message to the third device, cause the one or more processors to provide the contextual message based on determining that the third device is connected to the same network as the second device.

18. The computer-readable medium of claim 16, where the contextual message includes a link to merchandise associated with the particular content, a link to information associated with the particular content, a link to a rewards program, or an instruction to cause the third device to perform a task.

19. The computer-readable medium of claim 16, where the plurality of instructions further cause the one or more processors to:
receive broadcasted content, associated with the television channel identifier, the time, and the geographic location,
where one or more instructions, of the plurality of instructions, to generate the fingerprint, cause the one or more processors to generate the fingerprint based on receiving the broadcasted content.

20. The computer-readable medium of claim 16, where the plurality of instructions further cause the one or more processors to:
receive the program information from a fourth device, as a request to provide the contextual message to a fifth device, after receiving the program information from the second device and after storing the information identifying the particular content in the content schedule;
identify the particular content from the content schedule;
identify the contextual message associated with the particular content; and
provide the contextual message to the fifth device.

* * * * *